(12) United States Patent
Chen et al.

(10) Patent No.: US 10,930,998 B2
(45) Date of Patent: Feb. 23, 2021

(54) ANTENNA SYSTEM AND ELECTRONIC DEVICE

(71) Applicant: AAC Technologies Pte. Ltd., Singapore (SG)

(72) Inventors: Yongli Chen, Shenzhen (CN); Zhongyue Wang, Shenzhen (CN); Yue Liang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/699,155

(22) Filed: Nov. 29, 2019

(65) Prior Publication Data

US 2020/0203805 A1 Jun. 25, 2020

(30) Foreign Application Priority Data

Dec. 24, 2018 (CN) .......................... 201811581112.5

(51) Int. Cl.
*H04B 1/40* (2015.01)
*H04M 1/02* (2006.01)
*H01Q 1/24* (2006.01)
*H01Q 5/314* (2015.01)
*H04W 88/06* (2009.01)

(52) U.S. Cl.
CPC ............. *H01Q 1/243* (2013.01); *H01Q 5/314* (2015.01); *H04W 88/06* (2013.01)

(58) Field of Classification Search
CPC .... H04B 7/024; H04B 7/0413; H04B 7/0452; H04B 1/40; H04B 1/03; H04B 1/08; H04M 1/02; H04M 1/03; H01Q 1/243; H01Q 5/314; H04W 88/06
See application file for complete search history.

(56) References Cited

U.S. PATENT DOCUMENTS

| | | | |
|---|---|---|---|
| 9,608,314 B1 * | 3/2017 | Kwon | H01Q 5/307 |
| 10,177,443 B2 * | 1/2019 | Xue | H01Q 1/48 |
| 2015/0022403 A1 * | 1/2015 | Lin | H01Q 1/44 343/702 |
| 2015/0155614 A1 * | 6/2015 | Youn | G06F 1/1656 343/702 |
| 2016/0315651 A1 * | 10/2016 | Hong | H01Q 9/42 |
| 2017/0244151 A1 * | 8/2017 | Han | H01Q 5/30 |
| 2018/0183137 A1 * | 6/2018 | Tsai | H01Q 21/28 |
| 2018/0248252 A1 * | 8/2018 | Hu | H01Q 1/243 |
| 2018/0331416 A1 * | 11/2018 | Yu | H01Q 9/42 |
| 2018/0366812 A1 * | 12/2018 | Kim | H01Q 13/106 |
| 2019/0081694 A1 * | 3/2019 | Zhou | H05K 1/189 |
| 2020/0044311 A1 * | 2/2020 | Gu | H01Q 1/243 |

(Continued)

*Primary Examiner* — Andrew Wendell
(74) *Attorney, Agent, or Firm* — W&G Law Group LLP

(57) ABSTRACT

An antenna system is provided. The antenna system has a system grounding unit, a metal frame and a main board. The metal frame is spaced apart from the system grounding unit to form a clearance zone. The metal frame is a first radiator. The antenna system further has a second radiator, a switch, a capacitor and a main matching circuit. The second radiator is located in the clearance zone. The main board has a feeding point. The metal frame has a first connecting part and a second connecting part. An end of the capacitor is connected to the second radiator, and another end of the capacitor is connected to the main matching circuit. The second radiator is connected to the main board via the switch.

7 Claims, 3 Drawing Sheets

(56) References Cited

U.S. PATENT DOCUMENTS

2020/0044315 A1\* 2/2020 Gu .................. H01Q 5/328
2020/0044346 A1\* 2/2020 Gu .................. H01Q 21/28
2020/0058993 A1\* 2/2020 Qiu .................. H01Q 5/35

\* cited by examiner

ANTENNA SYSTEM AND ELECTRONIC DEVICE

FIELD OF THE PRESENT INVENTION

The present invention relates to the field of communication technology, and more particularly to an antenna system and an electronic device.

DESCRIPTION OF RELATED ART

The fifth-generation mobile communication technology (5G) may include the Sub 6G and the millimeter wave (mm Wave). As the next generation of mobile communication network, the 5G network has a transmission speed significantly higher than the current 4G network, and has gradually become the development trend all over the world. How to add 5G antennas in current mobile phones is one of the main difficulties nowadays.

Multiple-Input Multiple-Output (MIMO) technology means that multiple transmitting antennas and multiple receiving antennas are respectively arranged at the transmitting end and the receiving end such that signals may be transmitted through the antennas at the transmitting end and the receiving end to improve communication quality. In this way, space resources can be fully used. By using multiple antennas for transmitting and receiving, capacity of system signal channels may be largely augmented without increasing frequency band resources or antenna transmitting power.

In order to add 5G function to current 4G antennas while keeping them to meet 4*4MIMO, it is required to add an antenna operating in the 3.4-3.8 GHz frequency band of Sub 6G to current antennas.

Therefore, a new antenna system and a new electronic device are required in order to solve the above problems.

BRIEF DESCRIPTION OF THE DRAWINGS

In order to clearly explain the technical solutions in the embodiments of the present invention, the drawings used in the description of the embodiments will be briefly described below. Obviously, the drawings in the following description are merely some embodiments of the present invention. For those of ordinary skill in the art, other drawings may also be obtained based on these drawings without any creative work.

DETAILED DESCRIPTION OF THE EXEMPLARY EMBODIMENT

The disclosure will now be described in detail with reference to the accompanying drawings and examples. Apparently, the described embodiments are only a part of the embodiments of the present invention, not all of the embodiments. All other embodiments obtained by a person of ordinary skill in the art based on the embodiments of the present invention without creative efforts shall fall within the protection scope of the present invention.

Figure 1:
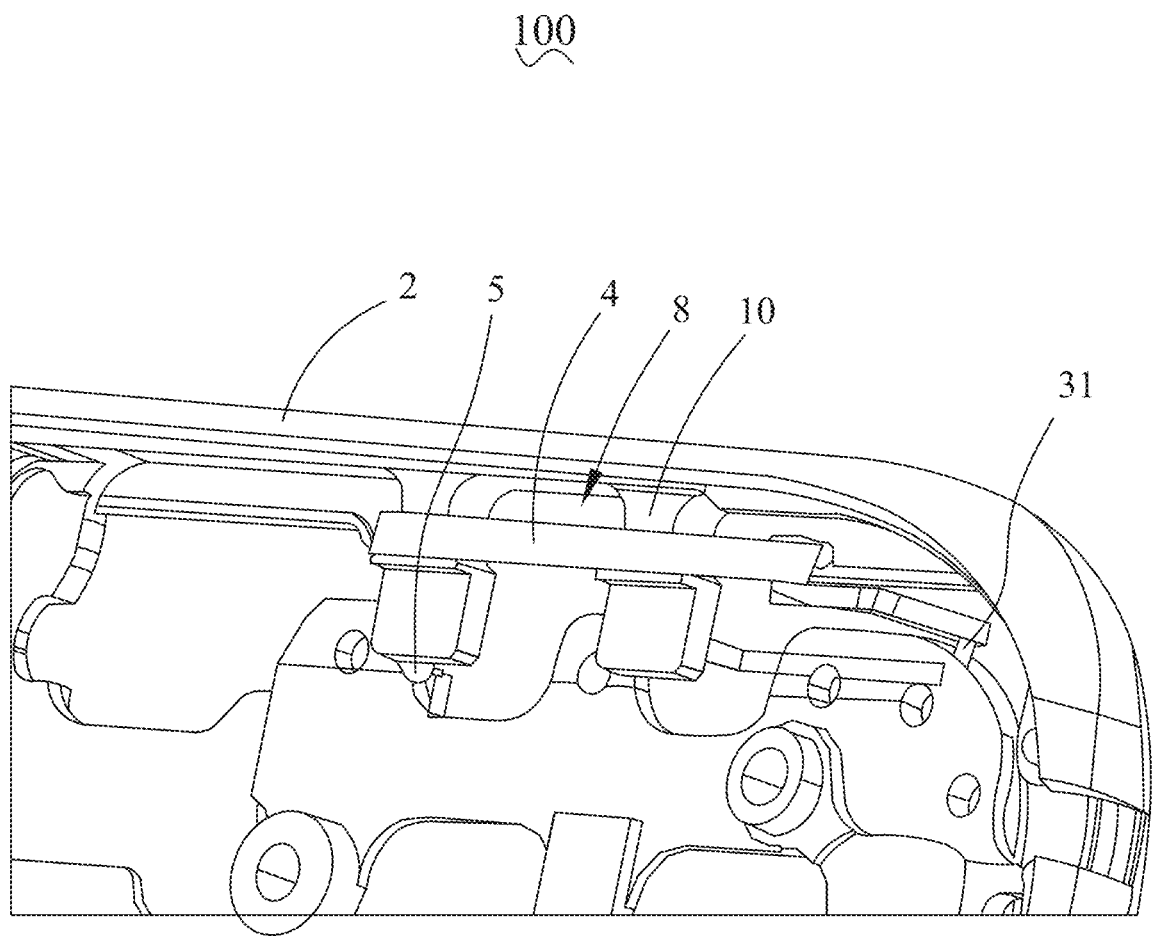
FIG. 1 is a schematic diagram of an antenna system according to the present invention.
Figure 2:
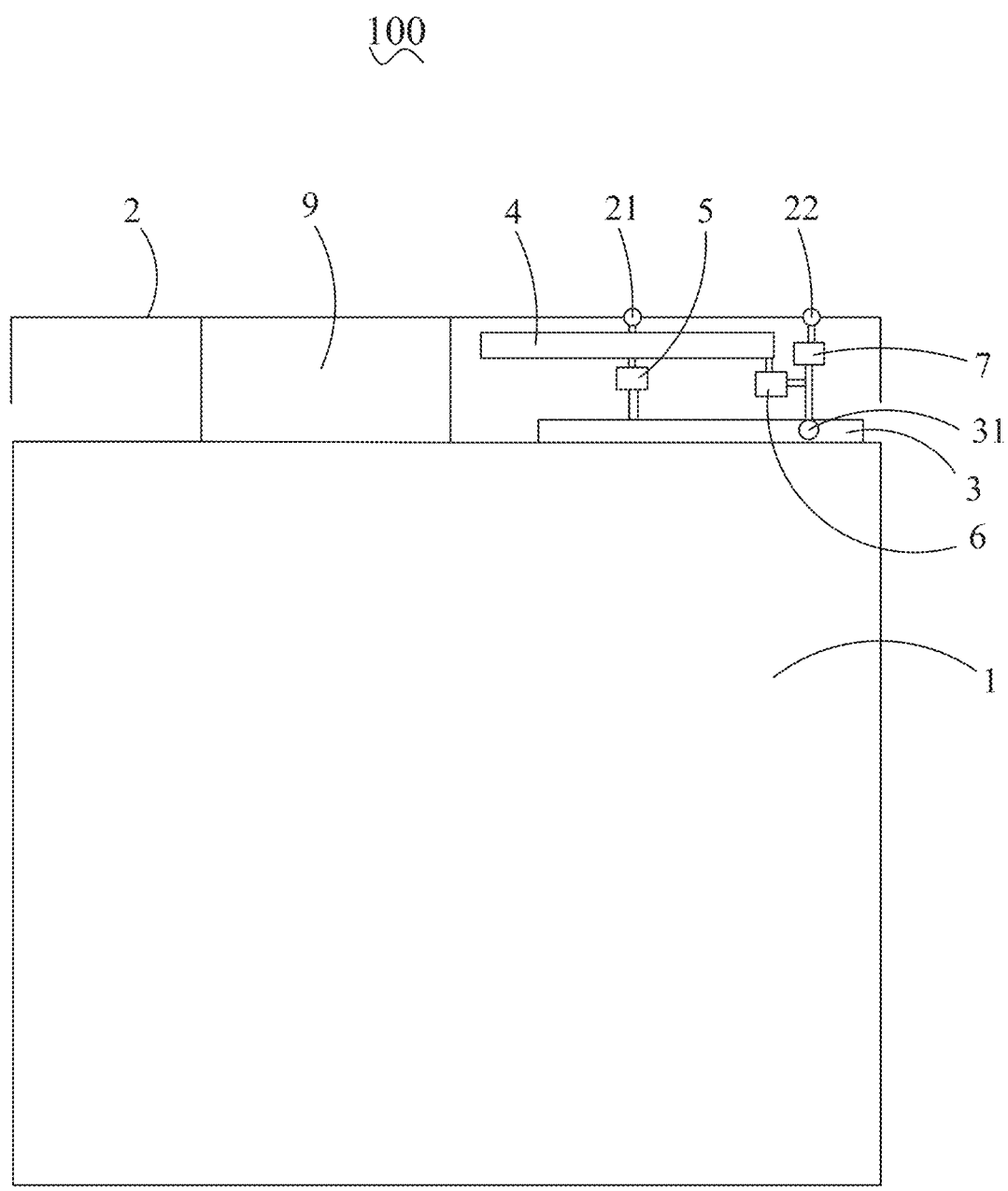
FIG. 2 is a schematic diagram of an antenna system according to the present invention.

Referring to FIGS. 1 and 2, the present invention provides an antenna system 100, which may be implemented in mobile terminals such as phones and tablet computers. In the following description, a cell phone will be taken as an example. The antenna system 100 may include a system grounding unit 1, a metal frame 2, a main board 3, a second radiator 4, a switch 5, a capacitor 6 and a main matching circuit 7. The metal frame 2 may be used as a first radiator operating in the 4G frequency band, specifically, in the frequency band of 600-900 MHz and 1710-2690 MHz. the second radiator 4 may operate in the 5G frequency band, specifically, in the frequency band of 3400-3800 MHz.

The cell phone may include a metal base plate which is usually used as the system grounding unit 1 and for supporting the display screen (not shown) of the cell phone. The system grounding unit 1 is usually set to overlap the mainboard 3.

The metal frame 2 and the system grounding unit 1 may be spaced apart to form a clearance zone 8. The metal frame 2 may be connected to the system grounding unit 1 through a connecting rib 9. The metal frame 2 is usually arranged at two ends of the cell phone along the longer axis of the cell phone.

The main board 3 may include a feeding point 31. The metal frame 2 may include a first connecting part 21 connected to the second radiator 4 and a second connecting part 22 connected to the feeding point 31 via the main matching circuit 7.

The second radiator 4 may have an elongated configuration. The first connecting part 21 and the switch 5 may be connected to two opposite longer sides of the second radiator 4. The capacitor 6 may be connected to an end of the second radiator 4 along a length direction of the second radiator 4. The antenna system 100 may further include a plastic support 10 located in the clearance zone 8. The second radiator 4 may be arranged on the plastic support 10. In some embodiments of the present invention, the second radiator 4 may be formed on the surface of the plastic support 10 through a laser direct structuring (LDS) or FPC process.

The capacitor 6 may be a low resistance capacitor. One end of the capacitor 6 may be connected to the second radiator 4. The other end of the capacitor 6 may be connected to the main matching circuit 7. The capacitor 6 may be utilized to isolate 4G and 5G radio frequency signals from each other. The second radiator 4 may be connected to the main board 3 via the switch 5.

Figure 3:
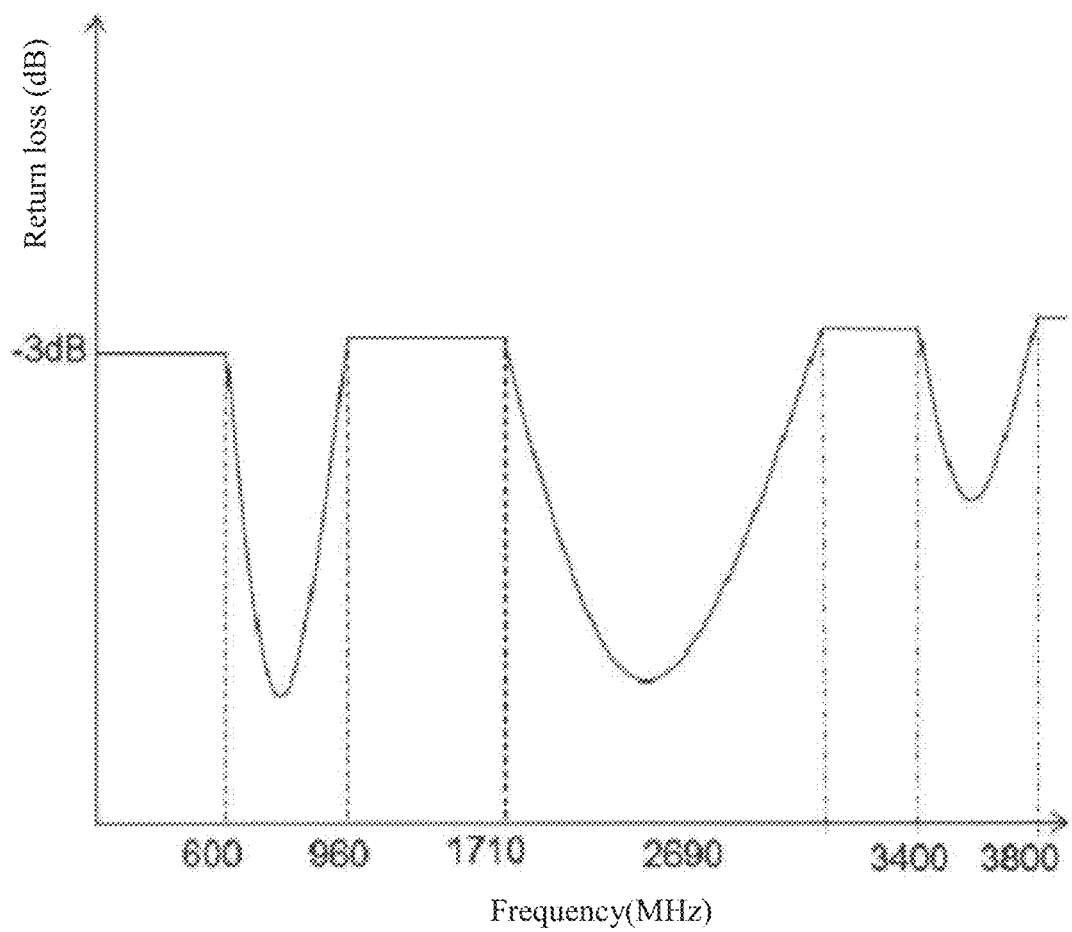
FIG. 3 illustrate the return loss curve of an antenna system according to the present invention.
Figure 4:
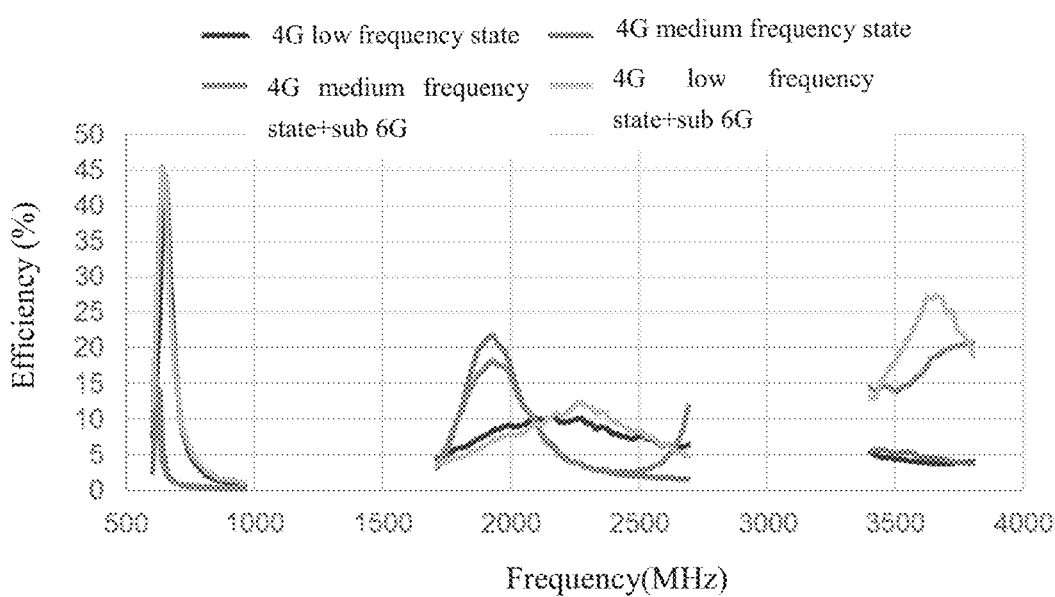
FIG. 4 illustrate an antenna efficiency chart of an antenna system according to the present invention.

Referring also to FIG. 3, according to test results, the metal frame 2 may be used as the first radiator operating in the frequency band of 600-960 and 1710-2690 MHz. After implementing the second radiator 4 and the capacitor 6, the second radiator 4 may operate in the frequency band of 3400-3800 MHz. That is, 4*4MIMO may be achieved without augmenting the number of antennas. Operating efficiencies of the antenna system 100 of the present invention in different frequency bands is illustrated in FIG. 4.

The present invention further provides an electronic device (not shown). The electronic device may include the above-described antenna system 100.

Compared with related art, the implementation of the present invention may put a Sub 6G antenna and a 4G antenna together without increasing the number of antennas. Since it is not necessary to increase the number of antenna feeding points, environment change, higher clearance requirement and even ID change due to augmentation of antennas may be avoided.

It should be noted that, the above are merely embodiments of the present invention, and further modifications can be made for those skilled in the art without departing from the inventive concept of the present invention. However, all these modifications shall fall into the protection scope of the present invention.

What is claimed is:

1. An antenna system, comprising a system grounding unit, a metal frame arranged around and connected to the system grounding unit, and a main board electrically connected to the system grounding unit, the metal frame being spaced apart from the system grounding unit to form a clearance zone, the metal frame being a first radiator, wherein the antenna system further comprises a second radiator, a switch, a capacitor and a main matching circuit;
the second radiator is located in the clearance zone;
the main board comprises a feeding point;
the metal frame comprises a first connecting part connected to the second radiator and a second connecting part connected to the feeding point via the main matching circuit;
an end of the capacitor is connected to the second radiator, another end of the capacitor is connected to the main matching circuit;
the second radiator is connected to the main board via the switch;
the second radiator has an elongated configuration, the first connecting part and the switch are connected to two opposite longer sides of the second radiator respectively, the capacitor is connected to an end of the second radiator along a length direction of the second radiator.

2. The antenna system of claim 1, wherein
the first radiator operates in a 4G frequency band, and the second radiator operates in a 5G frequency band.

3. The antenna system of claim 2, wherein
an operating frequency range of the first radiator is 600-960 and 1710-2690 MHz, and an operating frequency range of the second radiator is 3400-3800 MHz.

4. The antenna system of claim 3, wherein
the second radiator has an elongated configuration, the first connecting part and the switch are connected to two opposite longer sides of the second radiator respectively, the capacitor is connected to an end of the second radiator along a length direction of the second radiator.

5. The antenna system of claim 1, further comprising a plastic support located in the clearance zone, wherein the second radiator is arranged on the plastic support.

6. The antenna system of claim 4, wherein
the second radiator is formed on a surface of the plastic support through a laser direct structuring (LDS) or FPC process.

7. An electronic device, comprising the antenna system of claim 1.

* * * * *